United States Patent
Volbers

(10) Patent No.: US 10,742,077 B2
(45) Date of Patent: Aug. 11, 2020

(54) SOFT MAGNETIC LAMINATED CORE AND METHOD OF PRODUCING A LAMINATED CORE FOR A STATOR AND/OR ROTOR OF AN ELECTRIC MACHINE

(71) Applicant: Vacuumschmelze GmbH & Co. KG, Hanau (DE)

(72) Inventor: Niklas Volbers, Bruchkobel (DE)

(73) Assignee: VACUUMSCHMELZE GMBH & CO. KG, Hanau (DE)

(*) Notice: Subject to any disclaimer, the term of this patent is extended or adjusted under 35 U.S.C. 154(b) by 369 days.

(21) Appl. No.: 15/603,108

(22) Filed: May 23, 2017

(65) Prior Publication Data

US 2017/0346351 A1    Nov. 30, 2017

(30) Foreign Application Priority Data

May 24, 2016 (GB) .................................. 1609085.4

(51) Int. Cl.
| | |
|---|---|
| *H02K 1/02* | (2006.01) |
| *H01F 10/30* | (2006.01) |
| *H02K 15/02* | (2006.01) |
| *H02K 15/12* | (2006.01) |

(52) U.S. Cl.
CPC .............. *H02K 1/02* (2013.01); *H01F 10/30* (2013.01); *H02K 15/02* (2013.01); *H02K 15/12* (2013.01); *H02K 2213/03* (2013.01)

(58) Field of Classification Search
None
See application file for complete search history.

(56) References Cited

U.S. PATENT DOCUMENTS

| | | | |
|---|---|---|---|
| 2,221,983 A | 11/1940 | Mayer et al. | |
| 2,803,570 A | 8/1957 | Hespenheide | |
| 3,812,392 A | 5/1974 | Barton et al. | |
| 6,400,537 B2 * | 6/2002 | Sakakima ............. | B82Y 10/00 360/324.2 |
| 6,803,693 B2 | 10/2004 | Shah et al. | |

(Continued)

FOREIGN PATENT DOCUMENTS

| | | |
|---|---|---|
| DE | 19728172 A1 | 1/1999 |
| DE | 102007024822 B3 | 1/2009 |

(Continued)

OTHER PUBLICATIONS

Search Report for corresponding GB Application No. GB1708241.3 dated Sep. 15, 2017.

*Primary Examiner* — Kevin M Bernatz
(74) *Attorney, Agent, or Firm* — Dickinson Wright PLLC

(57) ABSTRACT

A soft magnetic laminated core is provided which comprises first laminations and second laminations arranged in a stack having a stacking direction substantially perpendicular to a major surface of the first laminations and the second laminations. The first laminations comprise a first soft magnetic alloy and the second laminations comprise a second soft magnetic alloy different from the first soft magnetic alloy. The first laminations and the second laminations are distributed in the stacking direction throughout the stack. The first laminations and/or the second laminations comprise an insulating coating that is thermally stable up to at least 850° C.

12 Claims, 6 Drawing Sheets

(56) References Cited

U.S. PATENT DOCUMENTS

| | | | |
|---|---|---|---|
| 8,943,677 B2 * | 2/2015 | Gerster | ................... C21D 8/12 29/417 |
| 2003/0193259 A1 | 10/2003 | Shah et al. | |
| 2006/0022886 A1 * | 2/2006 | Hein | ..................... B82Y 25/00 343/787 |
| 2006/0066169 A1 | 3/2006 | Daugherty et al. | |
| 2009/0168260 A1 | 7/2009 | Allen et al. | |
| 2009/0314521 A1 | 12/2009 | Gijs et al. | |
| 2011/0050376 A1 * | 3/2011 | Gerster | ............. F02M 51/0653 335/281 |
| 2012/0070567 A1 | 3/2012 | Watanabe et al. | |
| 2012/0156441 A1 * | 6/2012 | Gerster | ................... C21D 8/12 428/195.1 |
| 2013/0141202 A1 * | 6/2013 | Sturgess | ............... H01F 38/023 336/155 |
| 2014/0002219 A1 * | 1/2014 | Mitani | ..................... H01F 1/26 335/297 |
| 2014/0299233 A1 | 10/2014 | Waeckerle et al. | |

FOREIGN PATENT DOCUMENTS

| | | |
|---|---|---|
| DE | 102012213239 A1 | 1/2014 |
| DE | 102014222655 A1 | 5/2016 |
| GB | 1141321 | 1/1969 |
| GB | 2484568 A | 4/2012 |
| JP | S5852807 A | 3/1983 |
| JP | S63183188 A | 7/1988 |
| JP | H1012057 A | 1/1998 |
| RU | 2380234 C1 | 1/2010 |

\* cited by examiner

SOFT MAGNETIC LAMINATED CORE AND METHOD OF PRODUCING A LAMINATED CORE FOR A STATOR AND/OR ROTOR OF AN ELECTRIC MACHINE

RELATED APPLICATIONS

This application claims the benefit of GB patent application no. 1609085.4 filed on May 24, 2016.

STATEMENT REGARDING FEDERALLY SPONSORED RESEARCH

NONE.

TECHNICAL FIELD

The present disclosure is related to a soft magnetic core for a stator and/or rotor of an electric motor, and more particularly to a laminated soft magnetic core.

BACKGROUND OF THE DISCLOSURE

The stator or rotor of an electric machine, such as a motor or a generator, is typically fabricated from a soft magnetic material. The soft magnetic material may be provided in the form of laminations cut from a soft magnetic alloy foil which are stacked to form a laminated core. In use in an electric machine, the magnetic flux is carried in the soft magnetic material of the stator or rotor. Generally speaking, the higher the flux density in the material at a given field strength, the less material that is required and the higher the torque that can be achieved. Therefore, the size of the laminated core can be reduced if the magnetic flux carried by the soft magnetic core material is high. However, higher flux densities can lead to increased iron losses which can decrease the efficiency of the electric machine. These losses can be reduced by reducing the thickness of the laminations and/or by suitable selection of the soft magnetic material, for example.

GB 2 484 568 A discloses an electric motor, in which the rotor and/or stator has a soft magnetic laminated core made from laminations having the following composition by weight: 35-50% nickel, 0-2% cobalt, 0-1% manganese, 0-0.5% silicon and at least one of 0.5-8% chromium and/or 0.5-8% molybdenum, wherein the sum of Mo+Cr lies in the range 0.5-8%, with the balance being iron and impurities. This composition of the soft magnetic alloy has a high electrical resistance and low coercive field strength which leads to lower eddy current and hysteresis losses in a laminated core made from laminations of this composition.

However, further improvements for soft magnetic laminated cores are desirable.

SUMMARY OF THE DISCLOSURE

According to the invention, a soft magnetic laminated core is provided which comprises first laminations and second laminations arranged in a stack having a stacking direction substantially perpendicular to a major surface of the first laminations and the second laminations. The first laminations comprise a first soft magnetic alloy and the second laminations comprise a second soft magnetic alloy different from the first soft magnetic alloy. The first laminations and the second laminations are distributed in the stacking direction throughout the stack. The first laminations and/or the second laminations comprise an insulating coating. The insulating coating is thermally stable up to at least 850° C.

Instead of the laminated core being formed from laminations of a single composition, laminations of two differing compositions are used. A plurality of the first laminations and a plurality of the second laminations are provided which are distributed throughout the stack and throughout the laminated core. The laminated core has properties which are influenced by the properties of the two differing soft magnetic alloys. For example, if the number and thickness of the first laminations and the number and thickness of the second laminations is the same, the laminated core includes 50% of the first soft magnetic alloy and 50% of the second soft magnetic alloy. The properties of the laminated core may approximate an average of the properties of the first soft magnetic alloy and the second soft magnetic alloy. These properties may include soft magnetic properties, mechanical strength and/or iron losses, for example. By distributing the first and second laminations throughout the laminated core, an averaging of the property throughout the laminated core is achieved.

For example, the soft magnetic properties of the laminated core may be tailored for a particular application by selecting appropriate numbers of laminations of two differing soft magnetic alloys to provide an intermediate value of the soft magnetic property or properties rather than by changing the composition of the soft magnetic alloy providing all of the laminations of the laminated core. This enables the use of an alloy which is readily available, but which does not necessarily alone have the property or combination of properties desired for the laminated core. The properties of a laminated core can be tailored, for example to fulfil the criteria for a particular application, using available materials, each of which alone fails to meet the desired criteria.

A lamination can also considered to be a sheet having a lateral area which is much greater than its thickness. The lateral area provides the major surface.

In an embodiment, the first laminations and the second laminations are distributed uniformly throughout the stack in the stacking direction. This arrangement may be used to provide a uniform distribution or averaging of the properties of the first soft magnetic alloy and second soft magnetic alloy throughout the stack and throughout the laminated core.

In an embodiment, the first laminations and the second laminations are arranged in a pattern and the pattern repeats throughout the stack in the stacking direction. For example, the pattern may be described as BAAAB and the pattern repeat is BAAABBAAAB. In an embodiment, the first laminations and the second laminations may be alternately arranged in the stack, i.e. ABABAB, in which the pattern is AB.

The first soft magnetic alloy and the second soft magnetic alloy may belong to different alloy classes, or comprise different compositions within an alloy class. In an embodiment, first soft magnetic alloy and the second soft magnetic alloy may belong to different alloy classes and the first laminations comprise a FeSi-based alloy and the second laminations comprise a CoFe-based alloy.

FeSi-based alloys, for example Fe Si alloys with 2 to 4.5 weight percent Si, typically have lower raw materials costs than CoFe-based alloys. However, the induction B of FeSi-based alloys at typical field strengths of motor applications is less than that of CoFe-alloys, for example only up to 1.5 T to 1.8 T at 10.000 A/m for FeSi-based alloy with 3 weight % Si in contrast to a value of 2.3 T which is reached for a CoFe-based alloy such as 49 wt % Co, 49 wt % Fe and 2 wt % V. By using a mixture of laminations comprising either a FeSi-alloy or a CoFe-based alloy in the stack, a value for the induction B of the laminated core can be provided which lies between that of the two materials, and is therefore higher than the 1.5 T to 1.8 T of FeSi-based alloys at a lower raw materials cost compared to a core formed of CoFe-based alloy laminations alone.

For a certain lamination thickness, the losses of a laminated core fabricated using FeSi-based alloy laminations are higher than that of a laminated core fabricated using CoFe-based alloy laminations alone. Therefore, by using a mixture of FeSi-based alloy laminations and CoFe-based alloy laminations in a single laminated core, losses can be achieved, which are less than that of a laminated core formed solely from FeSi-based alloy laminations, at a raw materials cost which is less than that of a laminated core formed solely from CoFe-based alloy laminations. A mixture of FeSi-based alloy laminations and 50% CoFe-based alloy laminations in a single laminated core, improved induction values and lower losses can be achieved, compared to a laminated core formed solely from 17% CoFe-alloy laminations, at a raw materials cost which is around the same that of a laminated core formed solely from 17% CoFe-based alloy laminations.

The first laminations may comprise a FeSi-based alloy which may comprise a sum of Si and Al that lies in the range of 2 to 4.5 weight % and the remainder is Fe. For example a FeSi-based alloy may comprise around 2.7 weight % Si and no Al additions, 2.4 weight percent Si and 0.5 weight percent Al or 2.6 weight percent Si and 1.2 weight percent Al with the remainder being iron and unavoidable impurities.

The second laminations may comprise a CoFe-based alloy which may be one of the following alloys:

35 to 55 wt % Co, up to 2.5 wt % V, remainder Fe and unavoidable impurities, for example 49 wt % Co, 49 wt % Fe and 2 wt % V, 45 wt %≤Co≤52 wt %, 45 wt %≤Fe≤52 wt %, 0.5 wt %≤V≤2.5 wt % and unavoidable impurities, 35 wt %≤Co≤55 wt %, preferably 45 wt %≤Co≤52 wt %, 0 wt %≤Ni≤0.5 wt %, 0.5 wt %≤V≤2.5 wt %, remainder Fe and unavoidable impurities, 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, remainder Fe and unavoidable impurities, 47 wt %≤Co≤50 wt %, 1 wt %≤V≤3 wt %, 0 wt %≤Ni≤0.25 wt %, 0 wt %≤C≤0.007 wt %, 0 wt %≤Mn≤0.1 wt %, 0 wt %≤Si≤0.1 wt %, 0.07 wt %≤Nb≤0.125 wt %, 0 wt %≤Zr≤0.5 wt %, remainder Fe and unavoidable impurities, or 49 wt %≤Co≤51 wt %, 0.8 wt %≤V≤1.8 wt %, 0 wt %≤Ni≤0.5 wt %, remainder Fe and unavoidable impurities.

Suitable CoFe-based alloys are available under the trade names VACOFLUX® 50, VACOFLUX® 48, VACODUR® 49, VACODUR® 50, VACODUR® 5 Plus, Rotelloy, Hiperco®, Permendur, AFK® and 1J22.

Unavoidable or incidental impurities may be present in amounts up to 0.3 wt % and may include one or more of the group of elements consisting of C, O, N, S, P, Ce, Si, Mn, Mg, Be, Cu, Mo and W.

The first laminations and the second laminations may comprise the same thickness or different thicknesses.

In some embodiments, the first laminations provide a first volume $V_1$ of the first soft magnetic alloy in the laminated core and the second laminations provide a second volume $V_2$ of the second soft magnetic alloy in the laminated core, wherein $V_1+V_2=V_{total}$ and $V_{total}$ is total volume of soft magnetic material of the laminated core.

A number of the first laminations and/or a thickness of first laminations may be selected to provide the first volume $V_1$ of the first soft magnetic alloy in the laminated core. Similarly, a number of the second laminations and/or thickness of the second laminations may be selected to provide the second volume $V_2$ of the second soft magnetic alloy in the laminated core.

In an embodiment, the laminated core comprises a saturation polarisation Js≥2.0 T and/or an induction B(300 A/m) 1.5 T and/or an induction B (1000 A/m) 1.7 T and/or an induction B(2,500 A/m) 1.8 T and/or iron losses at 1.5 T and 50 Hz of less than 2.0 W/kg for a lamination thickness of 0.35 mm and/or iron losses at 2.0 T and 400 Hz of less than 80 W/kg for lamination thickness of 0.35 mm.

In some embodiments, an insulating coating is provided on some or all of the first laminations and second laminations. For example, in some embodiments, the first laminations include an insulating coating and the second laminations remain uncovered by an insulating coating, or the second laminations include an insulating coating and the first laminations remain uncovered by an insulating coating. These embodiments may be used if, for example, a stacking pattern of ABAB is used, since an insulating layer is arranged between each of the adjoining layers, i.e. AB, of the stack, if only one of the sets of laminations is coated.

In some embodiments, both the first laminations and the second laminations may include an insulating coating. The insulating coating on the first laminations and the insulating coating on the second laminations may be of the same composition or of differing composition.

In some embodiments, the insulating coating may be arranged on only the major surfaces of the first laminations and/or second laminations.

The insulating coating may be thermally stable up to temperatures of at least 850° C. This property may be used if the laminated core is to be heat treated after stacking. In particular, the insulating coating may be thermally stable up to temperatures of at least 850° C. under conditions used to anneal the stacked laminated core. For example, the insulating coating may be thermally stable up to temperatures of at least 850° C. in a hydrogen-containing atmosphere or an inert atmosphere, such as in an Argon atmosphere and may be thermally stable during and after a heat treatment at 700° C. to 880° C. for 2 hours to 10 hours in a hydrogen-containing atmosphere.

According to the invention, at least one of the laminations includes an insulating coating that is thermally stable at temperatures of at least 850° C., in particular at a temperature of 850° C. in a hydrogen-containing atmosphere. The insulation coating may also be thermally stable at temperatures above 850° C. in a hydrogen-containing atmosphere. The insulation coating may also decompose at temperatures above 850° C., for example above 1000° C. or 1200° C. in a hydrogen-containing atmosphere, and still fulfil the requirements of the invention, since it is thermally stable at 850° C. in a hydrogen-containing atmosphere.

In some embodiments, the thermal stability may be dependent on the atmosphere in which the insulation coating is heat treated. For example, the insulating coating may be thermally instable and decompose at 850° C. in oxygen-containing atmospheres, for example air, and thermally stable at 850° C. in a hydrogen-containing atmosphere and/or in an inert atmosphere, such as an argon atmosphere.

The suitability of an insulating coating can be determined by visual inspection of the coating after the heat treatment, for example to determine if the coating is continuous. A continuous coating is useful to provide sufficient electrical insulation between immediately neighbouring laminations in the core. In some embodiments, after the heat treatment, the coating may have a thickness of greater than 0.1 μm in order to provide a suitable insulation effect between neighbouring laminations of the stack. The presence of a very thin coating may be discernable visually and may be determined using optical interference methods.

"Thermally stable" is used herein to denote an insulating coating which adheres sufficiently to the lamination according to the norm DIN EN ISO 2409:2013-06. This norm defines a test in which an adhesive tape is applied to a coating and removed. If the coating has poor adhesion to the underlying substrate, such as the lamination, portions of the coating adhere to the adhesive surface of the removed adhesive tape and are removed from the underlying substrate.

The insulating coating may be inorganically based, for example oxide-based. The material forming the insulation coating may further include organic components when it is applied to the first and/or second laminations. If the insulating coating is heat treated after application, some or all of the organic components may be removed.

In some embodiments, the insulating coating on the first laminations and/or the second laminations comprises an inorganic coating. In an embodiment, the first laminations comprise a FeSi-based alloy and an inorganic coating. The inorganic coating may comprise organic components and may comprise organic additives for adhesion. Examples of such coatings are sold under the trade name of STABOLIT® 20, STABOLIT® 30 and STABOLIT® 60 by thyssenkrupp Steel Europe AG of Bochum, Germany.

In some embodiments, the insulating coating on the first laminations and/or the second laminations comprises a dielectric coating comprising Mg, for example magnesium oxide.

In some embodiments, a coating is applied to the first laminations and/or second laminations in the form of a Mg-methylate solution. During drying, the Mg-methylate solution is converted into magnesium hydroxide and then magnesium oxide. After the heat treatment, the coating includes magnesium oxide only. Herein, DL1 denotes such a coating.

In an embodiment, the second laminations comprise a CoFe-based alloy and a dielectric coating comprising Mg, for example magnesium oxide. Such a coating may be obtained by coating the alloy strip with a magnesium methylate-containing solution. Upon annealing this coating transforms into magnesium oxide.

A dielectric coating comprising zirconium oxide or aluminium oxide may also be used.

In some embodiments, a coating is applied the first laminations and/or second laminations in the form of a Zr-propylate solution which during drying is converted into zirconium oxide after the heat treatment. Herein, HITCOAT denotes such a coating. A HITCOAT coating may be used for laminations including a NiFe-based alloy.

The invention also provides a stator comprising the soft magnetic laminated core according to one of the embodiments described herein.

The invention also provides a rotor comprising the soft magnetic laminated core according to one of the embodiments described herein.

The invention also provides an electric machine, such as a motor or a generator, comprising a stator and/or rotor comprising a soft magnetic laminated core according to one of the embodiments described herein.

The invention also provides a method of producing a laminated core for a stator and/or rotor of an electric machine, which comprises:
  forming a plurality of first laminations from a first foil comprising a first soft magnetic alloy;
  forming a plurality of second laminations from a second foil comprising a second soft magnetic alloy,
  covering the first laminations and/or the second laminations with an insulating material,
    stacking the first laminations and the second laminations to form a laminated core so that the first laminations and the second laminations are distributed throughout the laminated core, and
    heat treating the laminated core, wherein the heat treating the laminated core comprises heat treating at 700° C. to 1200° C. for 2 hours to 10 hours, or 700° C. to 880° C. for 2 hours to 10 hours.

The first laminations may be formed from the first foil and/or the second laminations may be formed from the second soft foil by stamping or laser cutting. The stamping process may be progressive stamping, transfer stamping or a complete cut.

In some embodiments, the first laminations and/or second laminations during the assembly of the stack may have an outer contour which differs from the final outer contour. In these embodiments, the first laminations and the second laminations may be stacked and joined by adhesive to form the laminated core or packet to denote its intermediate status. The laminated core or packet may then be further worked, for example by wire erosion, to change the outer contour of the laminated core or packet.

For example, the first foil and the second may be cut into sheets, annealed, if desired, and optionally the surface may be oxidized in steam or by heating in air, for example at temperatures in the range of 350° C. to 550° C. for 1 to 10 hours. The first and second sheets are then stacked so that the first sheets and second sheets are distributed throughout the stack. The first and second sheets are glued to form a packet and the packet is subjected to wire eroding to form a laminated core from the packet with the required outer contour and laminations of the first foil and of the second foil which are distributed throughout the laminated core.

The sheets may not be annealed before stacking if the foil is provided in a fully finished form. For example, sheets comprising a FeSi-based alloy are typically available in a fully finished form so that a further anneal can be omitted.

In some embodiments, the first laminations and the second laminations are stacked in a pattern. The pattern may be repeated throughout the height of the stack. In an embodiment, the first laminations and the second laminations are alternately stacked.

The first laminations and the second laminations may be joined, that is joined to one another. The first laminations and the second laminations may be joined by welding.

In some embodiments, after placing one of the first laminations or second laminations on the stack, the one of the first laminations or second laminations is joined to an underlying lamination of the stack. In these embodiments, each of the laminations is joined serially as it is added to the stack. The one of the first laminations or second laminations may be joined to the underlying lamination by welding, for example.

The one of the first laminations or second laminations and the underlying lamination may be arranged in a stamping tool and the stack formed within the stamping tool. The first laminations and the second laminations may be stacked in a stamping tool in the pattern by stamping a first lamination core from the first foil and by stamping a second lamination core from the second foil in the order of the pattern.

In some embodiments, the method further comprises heat treating the first foil before forming the first laminations. This embodiment may be used if the first foil comprises a CoFe-based alloy, for example. In some embodiments, the method further comprises heat treating the second foil before forming the first laminations. This embodiment may be used if the first foil comprises a FeSi-based alloy, for example.

In some embodiments, the method further comprises heat treating the laminated core. This heat treatment may be carried out after the stack of laminations for the laminated core is complete and the laminations have been joined, for example by welding. The heat treatment may be carried out at 700° C. to 1200° C. for 2 hours to 10 hours and may take place in vacuum or in a protective atmosphere or in a hydrogen-containing reducing atmosphere. A protective atmosphere may be provided by an inert gas, such as argon or nitrogen. A hydrogen-containing atmosphere may be provided by a mixture of hydrogen and nitrogen, a mixture of hydrogen and argon or by pure hydrogen. The atmosphere should have a sufficiently low dew point, for example below 0° C.

The conditions of the heat treatment may depend on the composition of the laminations and, optionally, the composition of the coating. For example, the maximum temperature may be 1200° C. for laminations comprising a NiFe alloy and FeSi alloy or NiFe-alloys of differing composition and an insulation coating comprising zirconium oxide. For a laminated core including laminations comprising a SiFe alloy and a CoFe alloy, the temperature range may be restricted to 700° C. to 880° C. for 2 hours to 10 hours.

In some embodiments, the first laminations and the second laminations are coated with an insulating coating. The composition of the insulating coating may be the same for both the first laminations and the second laminations. In some embodiments, the first laminations are coated with an insulating material having a first composition and the second laminations are coated with an insulating material having a second composition, which is different from the first composition.

In some embodiments, after the laminated core has been assembled and heat treated a further heat treatment is carried out in an oxidising atmosphere. This heat treatment may be used to form an insulating oxide coating that covers the first laminations and/or second laminations. The heat treatment conditions may be selected such that $\alpha Fe_2O_3$ is formed which has a higher electrical resistivity than $Fe_3O_4$.

The oxidizing heat treatment may be carried out by heat treating in air, for example by heat treating in air at temperatures in the range of 350° C. to 550° C. for 30 minutes to 3 hours. Alternatively, the oxidizing heat treatment may be carried out under steam. For example, the laminated cored may be heated up in a nitrogen atmosphere to 500° C., whereby steam is introduced at temperatures of 360° C. and above, and the temperature held at 500° C. for around 1 hour, following by cooling to 360° C. without steam and cooling to 200° C. under nitrogen. The thickness of the oxide layer may be kept small so that adhesion of the oxide layer to the lamination is improved and less strain is introduced. By reducing the strain, any worsening of the magnetic properties can be avoided.

The invention also provides a method of stacking laminations to form a laminated core having at least one predetermined magnetic property Z. The method comprises:

determining a volume X of a first soft magnetic alloy having a value $Z_A$ of a magnetic property Z and a volume Y of a second soft magnetic alloy having a value $Z_B$ of the magnetic property Z, wherein $Z_A \neq Z_B$, required to produce a value $Z_C$ of the magnetic property Z in a laminated core according to the formula:

$$Z_C = Z_A*(X/(X+Y)) + Z_B*(Y/(X+Y))$$

wherein Z is the magnetic property, $Z_C$ is the value of the magnetic property Z of the laminated core, $Z_A$ is the value of the magnetic property Z of the first soft magnetic alloy, $Z_B$ is the value of the magnetic property Z of the second soft magnetic alloy, X is the volume of the first magnetic alloy in the laminated core, Y is the volume of the second magnetic alloy in the laminated core and (X+Y) is the total volume of the laminated core;

determining a number $N_1$ of first laminations having a thickness x formed from the first soft magnetic alloy to provide the volume X and a number $N_2$ of second laminations having a thickness y from the second soft magnetic alloy to provide the volume Y, wherein $x = y*(X/Y)$, and stacking the number $N_1$ of first laminations and the number $N_2$ of second laminations to produce a laminated core having the magnetic property $Z_C$.

The predetermined magnetic property Z may be the induction B at a magnetic field H, so that Z=B(H).

In some embodiments, x=y so that the thickness of the first and second laminations is substantially the same. Alternatively, $x \neq y$ so that the thickness of the first and second laminations differs. In some embodiments, $N_1 = N_2$ so that the number of the first and the number of the second laminations is the same. Alternatively, $N_1 \neq N_2$ so that the number of the first and the number of the second laminations differs.

The first laminations and the second laminations are stacked such that the first and second laminations are distributed throughout the laminated core. In some embodiments, the first laminations and the second laminations are distributed uniformly throughout the laminated core. The first and second laminations may be stacked in a pattern which repeats along the height of the laminated core.

BRIEF DESCRIPTION OF THE DRAWINGS

Embodiments will now be described with reference to the drawings and examples.

DETAILED DESCRIPTION OF A PREFERRED EMBODIMENT

Table 1 illustrates the coercive field strength, permeability, induction and polarisation measured for laminated cores according to the invention and comparison laminated cores.

Table 2 illustrates the losses measured for the laminated cores.

Figure 1:
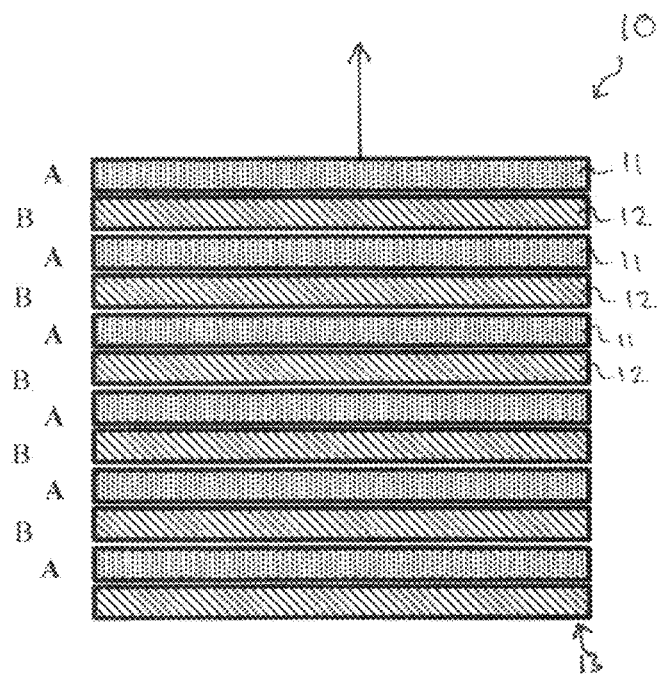
FIG. 1 illustrates a schematic view of a laminated core including a stack of first laminations and second laminations having a first pattern.

FIG. 1 illustrates a schematic review of a laminated core 10 including a plurality of first laminations 11 and a plurality of second laminations 12. The first laminations 11 include a first soft magnetic alloy of a first composition and the second laminations 12 include a second soft magnetic alloy of a second composition which is different from the first composition. In this particular embodiment, first laminations 11 include an FeSi-based alloy and the second laminations 12 include a CoFe-based alloy. The first laminations 11 and the second lamination 12 are arranged in a stack in an alternating pattern to form a stack 13 having a stacking direction that is substantially perpendicular to a major surface of the first laminations and of the second laminations. The stacking direction is indicated in the drawings with an arrow. The pattern can be described as ABAB.

In the laminated core 10, the thickness of the first laminations 11 and the thickness of the second laminations 12 is substantially the same. Therefore, if the number of first laminations 11 and the number of second laminations 12 is also the same, the laminated core 10 includes 50% of the first soft magnetic alloy forming the first laminations 11 and 50% of the second soft magnetic alloy forming the second laminations 12.

Since the first soft magnetic alloy forming the first laminations 11 and the second soft magnetic alloy forming the second laminations 12 have different compositions, the soft magnetic properties of the first laminations 11 and of second laminations 12 are different. Therefore, the laminated core 10 includes properties which are an average of the properties of the first soft magnetic alloy and the second soft magnetic alloy. For example, if the first magnetic alloy has an induction $B(H)_A$ and the second soft magnetic alloy an induction $B(H)_B$, the laminated core has an induction $B(H)_{core}$ substantially corresponding to $(B(H)_A+B(H)_B)/2$.

The stacking pattern ABAB repeats throughout the height of the stack 13 so that the first laminations 11 and second laminations 12 are distributed uniformly throughout the stack 13 in the stacking direction.

The laminated core may also have different stacking patterns. For example, the stacking pattern may include two first laminations stacked on two second laminations to give a pattern AABB, which when repeated throughout the stack in the stacking direction, results in AABBAABB.

Figure 2:
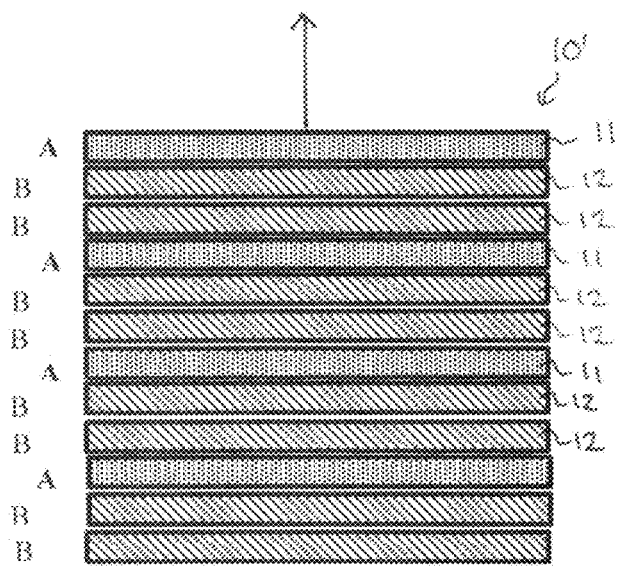
FIG. 2 illustrates a schematic view of a laminated core including a stack of first laminations and second laminations having a second pattern.

In some embodiments, such as that illustrated in FIG. 2, the number of the first laminations 11 and the number of the second laminations 12 within the laminated core 10' differs. The different numbers of first laminations 11 and second laminations 12 may be used in order to provide differing proportions of the first soft magnetic alloy and second soft magnetic alloy within the laminated core 10'. For example, if the first laminations 11 and the second laminations 12 have the same thickness, in order to provide a core including one third of the first soft magnetic alloy and two thirds of the second magnetic alloy, a stacking order of ABBABB, as illustrated for the laminated core 10' in FIG. 2, may be provided.

Figure 3:
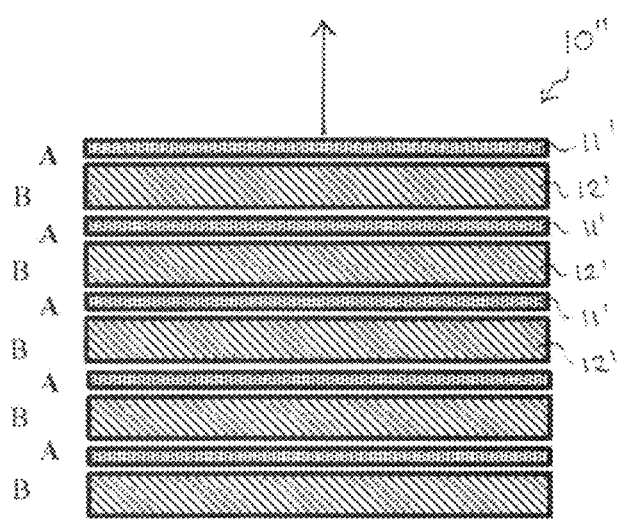
FIG. 3 illustrates a schematic view of a laminated core including a stack of first laminations and second laminations having different thicknesses.

In some embodiments, such as that illustrated in FIG. 3, the first laminations 11' and the second laminations 12' of the lamination core 10" have different thicknesses. The different thicknesses may also be used to vary the proportion of the first soft magnetic alloy and the second magnetic alloy within the laminated core 10". In the embodiment illustrated in FIG. 3, the number of first laminations 11' and the number of second laminations 12' is the same and the thickness of the first laminations 11' is less than the thickness of the second laminations 12'. The stacking pattern is ABAB which is the same as that illustrated in FIG. 1. However, due to the differing thicknesses, the proportion of the first soft magnetic alloy in the laminated core 10" is less than 50% and the proportion of the second soft magnetic alloy is more than 50%. For example, to provide 60% of the second soft magnetic alloy and 40% of the first soft magnetic alloy, the second laminations 12' may have a thickness of 0.525 mm and the first laminations 11' may have a thickness of 0.35 mm if same number of first and second laminations 11', 12' is provided.

In some embodiments, the number and thickness of the first and second laminations may be selected so as to tailor a magnetic property of the laminated core according to the following equation:

$$Z_C = Z_A * (X/(X+Y)) + Z_B * (Y/(X+Y))$$

wherein Z is the magnetic property, $Z_C$ is the value of the magnetic property Z of the laminated core, $Z_A$ is the value of the magnetic property Z of the first soft magnetic alloy, $Z_B$ is the value of the magnetic property Z of the second soft magnetic alloy, X is the volume of the first magnetic alloy in the laminated core, Y is the volume of the second magnetic alloy in the laminated core and (X+Y) is the total volume of the laminated core. For example, Z may be the induction B(H).

The stack may be formed by preforming the first laminations and the second laminations, for example by cutting laminations of the desired shape from alloy foil of the two desired compositions, and then stacking the preformed first and second laminations in the desired pattern to form the laminated core. In some embodiments, the stacking is carried out in a stamping tool such that the first and second laminations are cut from the foil in the order of the pattern. For example, a lamination is stamped from a foil comprising a first soft magnetic alloy, the next lamination is stamped from a foil comprising the second soft magnetic alloy, the next lamination is stamped form a foil comprising the first soft magnetic alloy and so on in order to form a stack having a pattern ABAB within the stamping tool.

After the stack of first and second laminations has been formed, the first and second laminations may be joined to one another by welding. In some embodiments, as each lamination is added to the stack, it is welded to the underlying lamination of the stack. The first and second laminations may also be joined by gluing or interlocking.

If gluing is used, the first and/or second foil may be cut into sheets, the laminations cut from the sheet, for example by stamping or laser cutting. The first and/or second laminations may be annealed and optionally surface oxidised in air or steam and then stacked so that the first and second laminations are distributed through the stack and glued to form a laminated core in which the first and second laminations are distributed throughout the stack.

After production of the laminated core, the laminated core may be heat treated to achieve the desired magnetic properties. For a laminated core including laminations comprising a CoFe-based alloy, the heat treatment may be carried out at 700° C. to 880° C. for 2 to 10 hours for example. The heat treatment may be carried out in vacuum or under a protective gas, such as argon, or a hydrogen containing gas. The heat treatment may be carried out statically or continuously.

In the examples, seven laminated cores are produced. In each case, the thickness of the laminations is 0.35 mm and measurements are carried out for ring shaped laminations having an outer diameter of 28.5 mm and an inner diameter of 20.0 mm. The first laminations are formed from a FeSi-based alloy including 3% silicon. The second laminations are formed from a CoFe-based alloy, in particular VACODUR® 49. A reference laminated core, example 7, includes laminations of a CoFe-based alloy including 17% Co, in particular VACOFLUX® 17.

The laminated core of example 1 is a comparison example and includes only laminations of the FeSi-based alloy and can be considered to have a pattern AAAA.

The laminated core of example 6 is a comparison example and includes only laminations of the CoFe-based alloy and can be considered to have a pattern BBBB.

The laminated core of example 2 includes two-thirds FeSi laminations and one-third CoFe laminations and has a stacking pattern AABAAB.

The laminated core of example 3 includes 50% FeSi laminations and 50% CoFe laminations and includes a stacking pattern ABABAB.

The laminated core of example 4 also includes 50% FeSi laminations and 50% CoFe laminations and has different stacking pattern of AAABBB.

The laminated core of example 5 includes one third FeSi and two third CoFe and includes a stacking pattern ABBABB.

TABLE 1

| # | Materials | Stacking sequence | Hc in A/m | μmax | B (300 A/m) in T | B (1000 A/m) in T | B (2500 A/m) in T | B (5000 A/m) in T | B (10000 A/m) in T | J (10000 A/m) in T |
|---|---|---|---|---|---|---|---|---|---|---|
| 1 | only 3% SiFe | AAAAAA... | 32.0 | 14643 | 1.390 | 1.467 | 1.537 | 1.617 | 1.730 | 1.717 |
| 2 | ⅔ SiFe ⅓ CoFe | AABAAB... | 38.1 | 14893 | 1.603 | 1.717 | 1.784 | 1.843 | 1.923 | 1.911 |
| 3 | ½ SiFe ½ CoFe | ABABAB... | 41.2 | 15732 | 1.719 | 1.840 | 1.904 | 1.953 | 2.017 | 2.004 |
| 4 | ½ SiFe ½ CoFe | AAA...BBB | 41.0 | 15772 | 1.718 | 1.777 | 1.900 | 1.948 | 2.009 | 1.996 |
| 5 | ⅓ SiFe ⅔ CoFe | ABBABB... | 43.4 | 16579 | 1.831 | 1.964 | 2.023 | 2.061 | 2.107 | 2.094 |
| 6 | only 50% CoFe | BBBBBB... | 46.8 | 18335 | 2.047 | 2.200 | 2.250 | 2.270 | 2.283 | 2.270 |
| 7 | Reference: 17% CoFe | CCCCCC... | 82.5 | 4172 | 1.228 | 1.527 | 1.655 | 1.763 | 1.908 | 1.895 |

Figure 4:
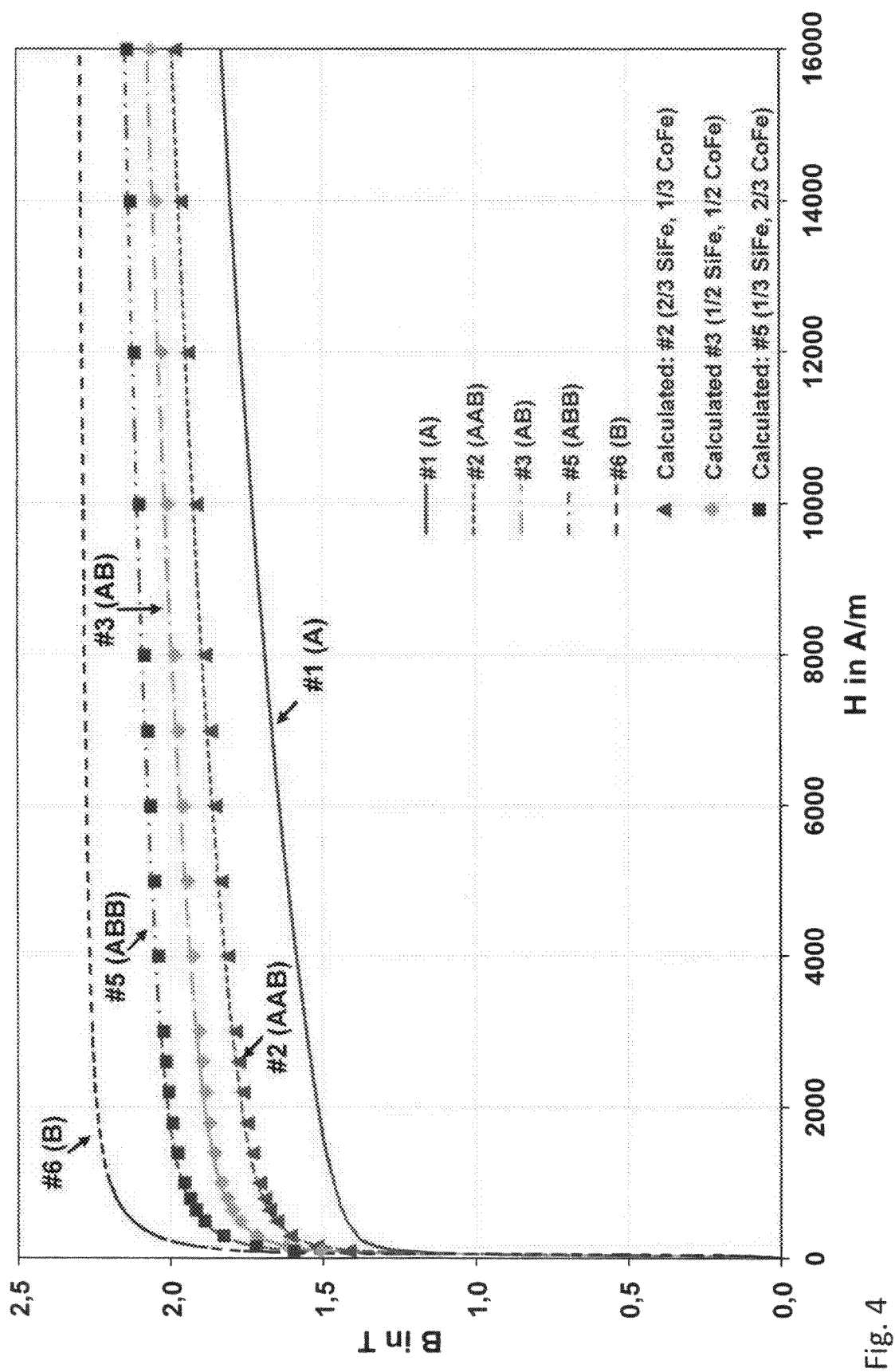
FIG. 4 illustrates a graph of induction B measured at different field strengths (H) for the laminated cores and calculated values of the induction B at different field strengths (H).
Figure 5:
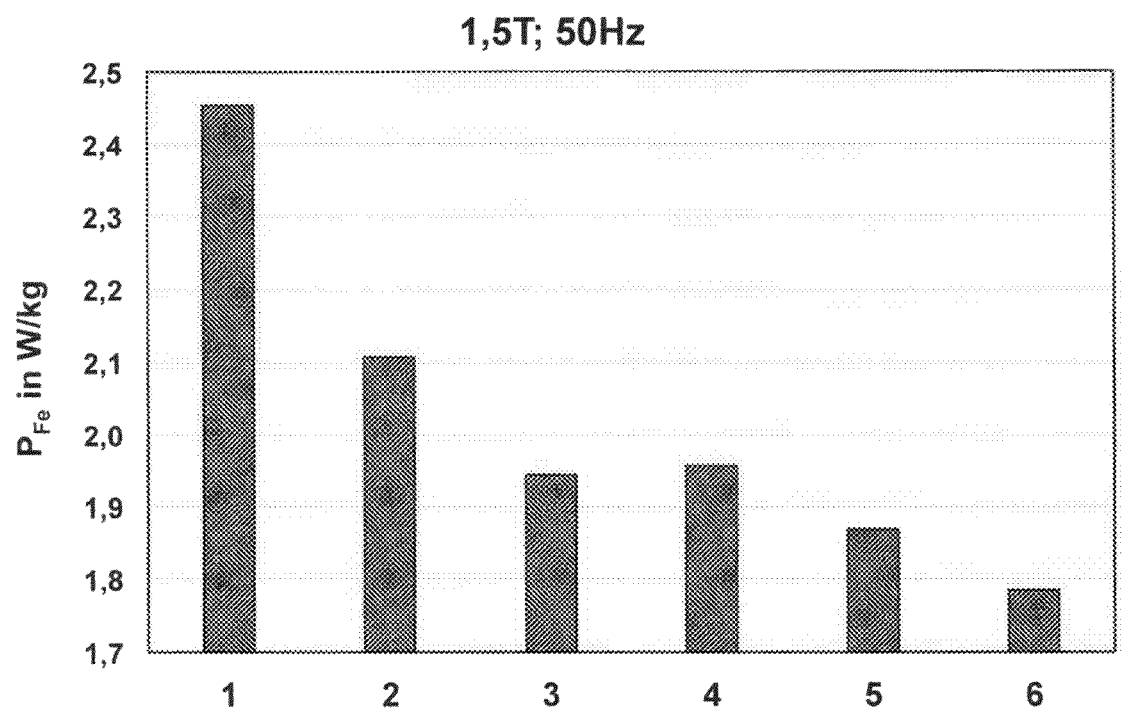
FIG. 5 illustrates a graph of losses of the laminated cores measured at 1.5 T and a frequency of 50 Hz.
Figure 6:
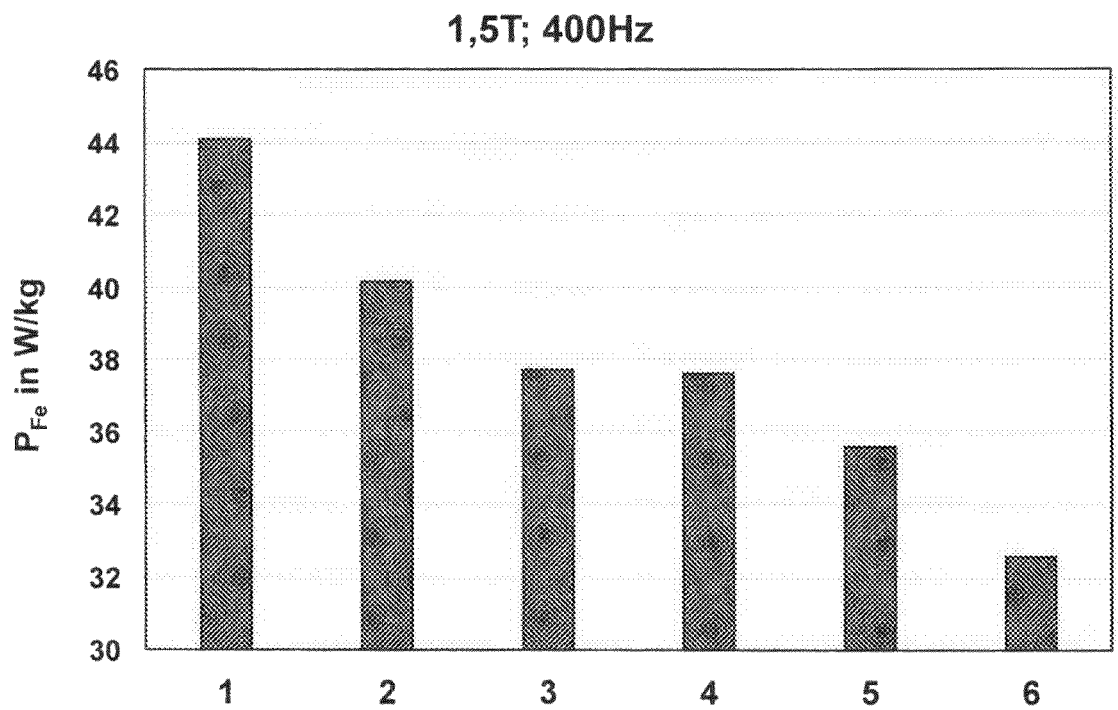
FIG. 6 illustrates a graph of losses of the laminated cores measured at 1.5 T and a frequency of 400 Hz.
Figure 7:
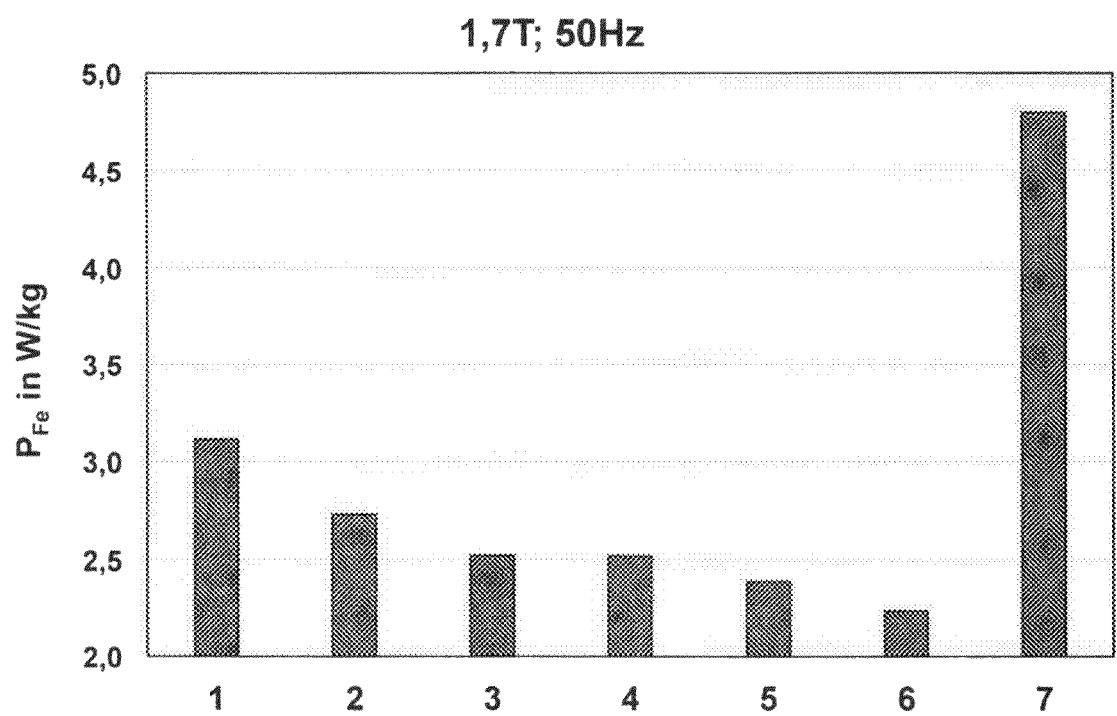
FIG. 7 illustrates a graph of losses of the laminated cores measured at 1.7 T and a frequency of 50 Hz.
Figure 8:
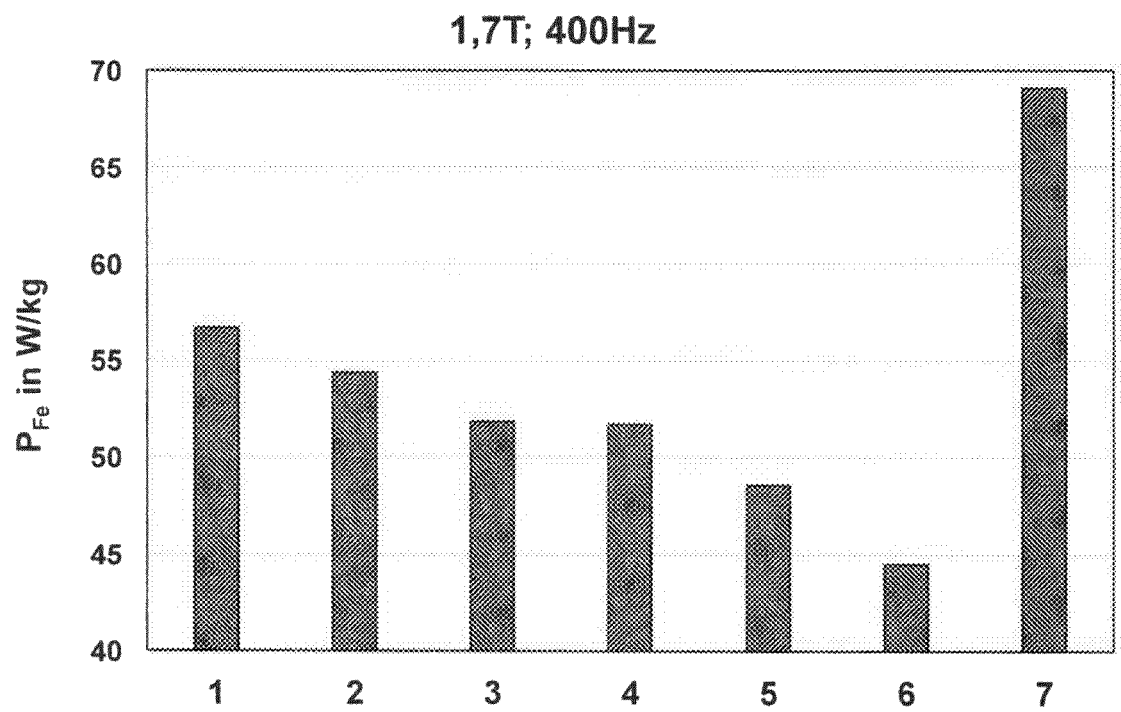
FIG. 8 illustrates a graph of losses of the laminated cores measured at 1.7 T and a frequency of 400 Hz.
Figure 9:
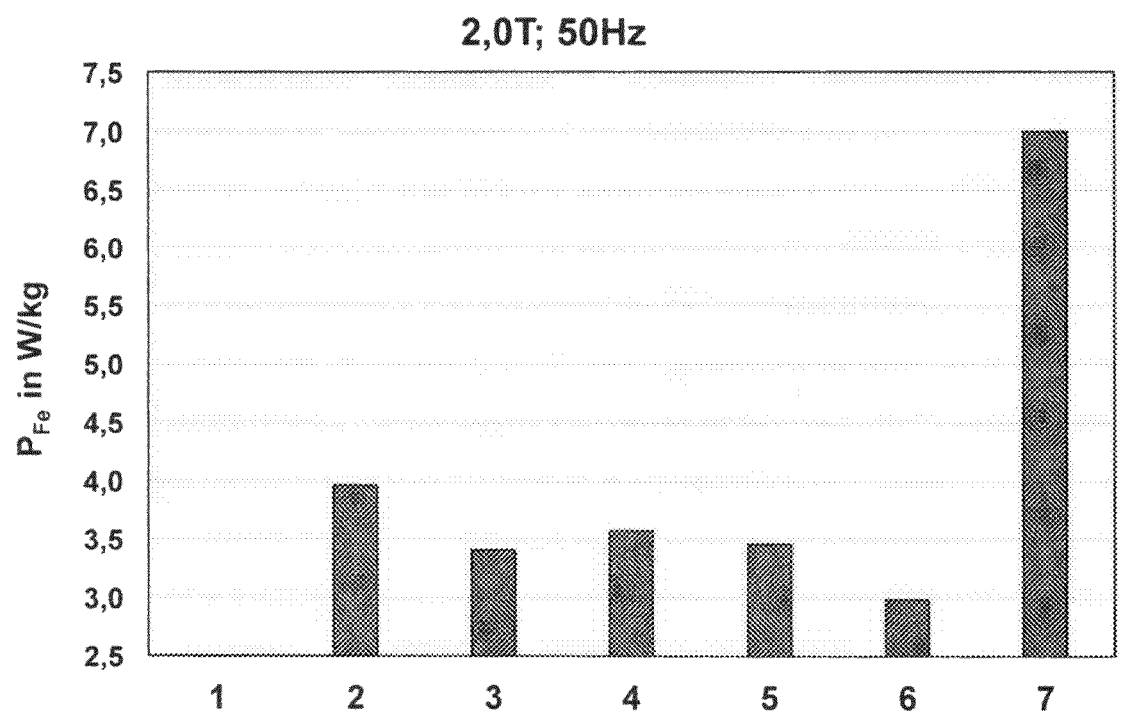
FIG. 9 illustrates a graph of losses of the laminated cores measured at 2.0 T and a frequency of 50 Hz.
Figure 10:
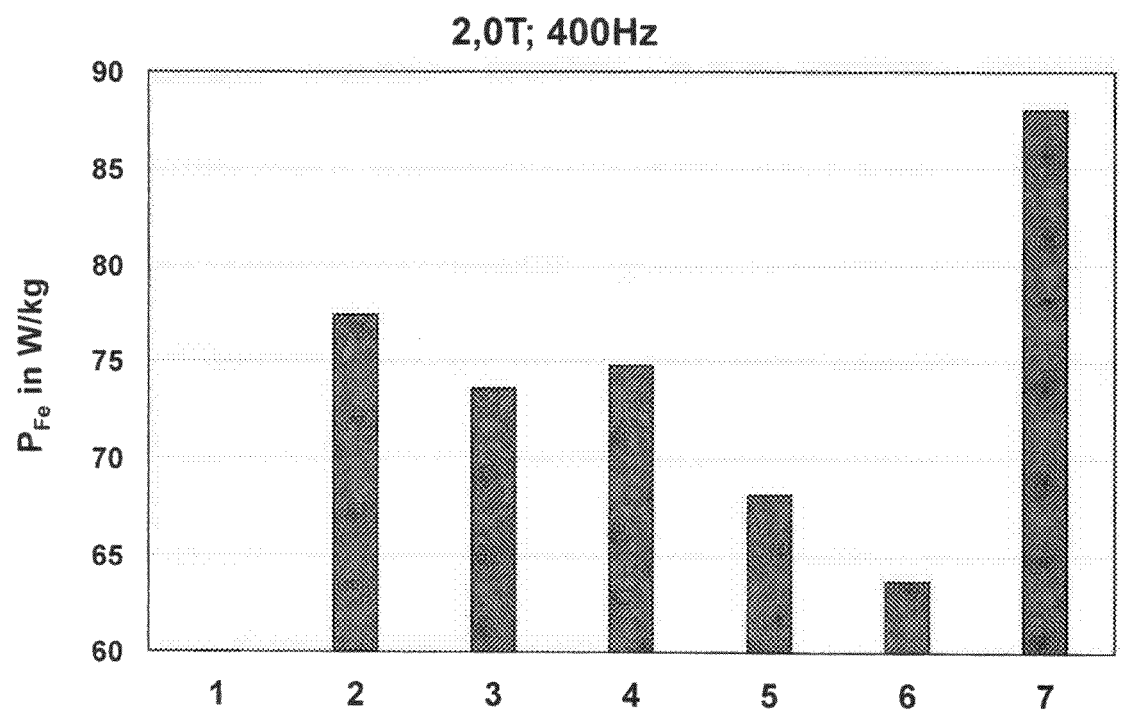
FIG. 10 illustrates a graph of losses of the laminated cores measured at 2.0 T and a frequency of 400 Hz.

The coercive field strength, permeability and induction polarisation measured for examples 1 to 7 are summarised in table 1 and illustrated in the graph of FIG. 4. The laminated cores of examples 2 to 5 include both FeSi-based laminations and CoFe-based laminations and have an induction B measured at 300 A/m, 1000 A/m, 2500 A/m, 5000 A/m and 10000 A/m which is greater than that measured for the laminated core of example 1 which includes only FeSi laminations. For example, examples 2 to 5 include an induction of greater than 1.6 T for B measured at 300 A/m, which is higher than the value of 1.39 T measured for example 1. The values of B(H) measured for example laminated cores 2, 3 and 5 correspond to the values of B(H) which are predicted by calculation, as is illustrated in FIG. 4.

TABLE 2

| # | Materials | Stacking sequence | P (1.5 T; 50 Hz) in W/kg | P (1.5 T; 400 Hz) in W/kg | P (1.7 T; 50 Hz) in W/kg | P (1.7 T; 400 Hz) in W/kg | P (2.0 T; 50 Hz) in W/kg | P (2.0 T; 400 Hz) in W/kg |
|---|---|---|---|---|---|---|---|---|
| 1 | only 3% SiFe | AAAAAA... | 2.45 | 44.1 | 3.11 | 56.6 | — | — |
| 2 | ⅔ SiFe ⅓ CoFe | AABAAB... | 2.11 | 40.2 | 2.73 | 54.4 | 3.97 | 77.4 |
| 3 | ½ SiFe ½ CoFe | ABABAB... | 1.94 | 37.7 | 2.52 | 51.8 | 3.40 | 73.6 |
| 4 | ½ SiFe ½ CoFe | AAA...BBB | 1.96 | 37.6 | 2.52 | 51.7 | 3.58 | 74.8 |

TABLE 2-continued

| # | Materials | Stacking sequence | P (1.5 T; 50 Hz) in W/kg | P (1.5 T; 400 Hz) in W/kg | P (1.7 T; 50 Hz) in W/kg | P (1.7 T; 400 Hz) in W/kg | P (2.0 T; 50 Hz) in W/kg | P (2.0 T; 400 Hz) in W/kg |
|---|---|---|---|---|---|---|---|---|
| 5 | ⅓ SiFe ⅔ CoFe | ABBABB . . . | 1.87 | 35.6 | 2.39 | 48.5 | 3.46 | 68.2 |
| 6 | only 50% CoFe | BBBBBB . . . | 1.79 | 32.6 | 2.23 | 44.5 | 2.99 | 63.7 |
| 7 | Reference: 17% CoFe | CCCCCC . . . | 3.8 | 54.1 | 4.8 | 69.1 | 7.0 | 88.0 |

The losses (P) measured for the laminated cores of examples 1 to 7 are summarised in table 2 and illustrated in the graphs of FIGS. 5 to 10. The values of the losses measured at 50 Hz and 400 Hz at 1.5 T and 1.7 T are lower for the laminated cores examples 2 to 5 compared to that of the laminated core of comparison example 1. Furthermore, whereas the losses of the lamination core of example 1 measured at 2.0 T are so high as to be impractical for use as a laminated core, the laminated cores of examples 2 to 5 have losses ranging from 3.97 to 3.40 W/kg (at 50 Hz and 2.0 T). The losses of the laminated cores of examples 2 to 5 are less than that measured for reference laminated core 7 including FeCo alloy including 17% cobalt.

Whilst in the embodiments and examples, the laminated core includes laminations comprising two differing soft magnetic alloys, the laminated core is not limited to two differing soft magnetic alloys and may also include laminations of three or more differing magnetic alloys having differing compositions and properties.

According to the invention, at least one of the laminations includes an insulating coating that this thermally stable at temperatures of at least 850° C., in particular is thermally stable after a heat treatment at temperatures of at least 850° C. in a hydrogen-containing atmosphere.

The suitability of a coating can be determined by visual inspection of the coating after the heat treatment to determine if the coating is continuous. After the heat treatment, the coating may have a thickness of greater than 0.1 µm in order to provide a suitable insulation effect between neighbouring laminations of the stack. The presence of a very thin coating may be discernable visually and may be determined using optical interference methods.

"Thermally stable" denotes an insulating coating which adheres sufficiently to the lamination according to the norm DIN EN ISO 2409:2013-06. This norm defines a test in which an adhesive tape is applied to a coating and removed. If the coating has poor adhesion to the underlying substrate, such as the lamination, portions of the coating adhere to the adhesive surface of the removed adhesive tape.

The suitability of various materials as insulation coatings in laminated cores including laminations fabricated from various alloys was investigated.

Example 1

In example 1, a laminated core including CoFe-based alloy laminations and NiFe-based alloy laminations is fabricated.

A 50%-CoFe alloy tape (VACODUR® 49) was coated with a magnesium-containing coating, in particular DL1, which after heat treatment includes magnesium oxide. DL1 denotes a coating which is applied to a surface in the form of a Mg-methylate solution which during drying is converted into magnesium hydroxide and then magnesium oxide. After the heat treatment, the coating includes magnesium oxide only.

50%-CoFe laminations may be heat treated at 880° C. for 6 hours in a hydrogen containing atmosphere to adjust the magnetic properties. Therefore, the insulating coating was subjected to this heat treatment to determine its suitability for use in the lamination stack. After the heat treatment, visual inspection confirmed that a continuous coating was present on the 50%-CoFe tape.

A 50%-NiFe alloy (PERMENORM® 5000 V5) was coated with a zirconium-containing coating, in particular HITCOAT, which after heat treatment includes zirconium oxide. HITCOAT denotes a coating which is applied to a surface in the form of a Zr-propylate solution which during drying is converted into zirconium oxide after the heat treatment. The 50%-NiFe tape with the zirconium-containing coating was subjected to a heat treatment at 880° C. for 6 hours in a hydrogen containing atmosphere to determine its suitability for use in the lamination stack. After the heat treatment, visual inspection confirmed that a continuous coating was present on the 50%-NiFe tape.

Therefore, a laminated core including alternate laminations including 50%-CoFe and 50%-NiFe may be fabricated using insulating coatings fabricated using DL1 and HITCOAT as both coatings are thermally stable at temperatures up to at least 850° C., in particular after a heat treatment at temperatures above 850° C. in a hydrogen-containing atmosphere.

Example 2

In example 2, a laminated core including CoFe-based alloy laminations and FeSi-based alloy laminations is to be fabricated.

A FeSi alloy (M400-65A) was coated with STABOLIT® 20 and subjected to a heat treatment at 900° C. for 6 hours in a hydrogen containing atmosphere to determine its suitability for use in the lamination stack. After the heat treatment, the coating was subjected to the adhesive tape test and it was determined that only a few isolated particles were removed from the coating and adhered to the adhesive tape.

For the CoFe-based alloy laminations, as coating fabricated using DL, as in example 1, may be used.

Therefore, a laminated core including alternate laminations including this FeSi alloy and 50%-CoFe may be fabricated using insulating coatings fabricated using STABOLIT® 20 and DL1, respectively, as both coatings are thermally stable at temperatures of at least 850° C., in particular in a hydrogen-containing atmosphere.

Example 3

In example 3, a laminated core including FeSi-based alloy laminations and NiFe-based alloy laminations is to be fabricated.

To fabricate a core including laminations including 50% NiFe alloy (PERMENORM® 5000 V5), it is desirable to heat treat the core at 1150° C. for 5 hours in a hydrogen-containing atmosphere in order to adjust the magnetic properties of the 50%-NiFe alloy. The laminations including the 50% NiFe alloy were coated with HITCOAT, the laminations including FeSi were not coated with an insulating layer. The laminations of differing composition were alternately stacked so that a layer of HITCOAT is positioned between adjacent 50%-NiFe and FeSi laminations in the stack.

After a heat treatment at 1150° C. for 5 hours in a hydrogen-containing atmosphere, an iridescent effect was discernable on the coated surfaces thus confirming the presence of the coating after the heat treatment.

Comparison Example 1

In comparison example 1, an FeSi alloy (NO20) tape was coated with a resin which hardens upon application of heat, for example at temperatures of around 200° C. These resins may be used to adhere the laminations to one another to from the stack and form the insulating coating between neighbouring laminations. STABOLIT® 70, which is sold by thyssenkrupp Steel Europe AG of Bochum, Germany, is an example of such a resin. The tape and coating was heat treated at 500° C. for 1 hour in a hydrogen-containing atmosphere. After this heat treatment, visual inspection of the tape did not reveal the presence of a coating. Therefore, such a resin-based coating is not thermally stable at temperatures of at least 850° C.

Comparison Example 2

In a comparison example 2, a tape including a FeSi alloy, in particular M400-65A, was coated with STABOLIT® 20 and heat treated at 1000° C. in a hydrogen-containing atmosphere to determine its suitability for a core including laminations including a FeSi alloy and a 50%-NiFe alloy (PERMENORM® 5000 V5). The 50%-NiFe alloy is to be heated treated at 1150° C. for 5 hours in a hydrogen-containing atmosphere in order to adjust the magnetic properties. After a heat treatment at 1000° C. in a hydrogen-containing atmosphere, the coating was subjected to the adhesive tape test according to DIN EN ISO 2409:2013-06. A continuous layer was found to be present on the removed adhesive surface indicating that a coating fabricated using STABOLIT® 20 is unsuitable for cores heat treated at temperatures of 1000° C. and above.

However, coatings fabricated using STABOLIT® 20 were found to be thermally stable at 900° C. in a hydrogen-containing atmosphere and, therefore, at temperatures up to at least 850° C.

Comparison Example 3

In comparison example 3, laminations comprising a 50%-CoFe alloy (VACODUR® 49) and laminations comprising a FeSi alloy (NO10) were alternately stacked to form a core. Both compositions of the laminations were uncoated. The stack was subjected to a heat treatment at 880° C. for 6 hours in a hydrogen-containing atmosphere to adjust the magnetic properties of the 50%-CoFe alloy. After the heat treatment, at least some of the laminations of the stack were found to be welded to one another. Further contact points may occur as the result of pressure applied to the core during use. Higher eddy current losses were found to result. These higher eddy current losses are believed to result at least in part from the lack of electrical insulation between the laminations of the core.

The invention claimed is:

1. A soft magnetic laminated core, comprising:
first laminations and second laminations arranged in a stack having a stacking direction substantially perpendicular to a major surface of the first laminations and the second laminations, wherein the first laminations comprise a first soft magnetic alloy and the second laminations comprise a second soft magnetic alloy different from the first soft magnetic alloy, wherein the first laminations and the second laminations are distributed in the stacking direction throughout the stack, and wherein the first laminations and/or the second laminations comprise an insulating coating that is thermally stable up to at least 850° C., and wherein the thermal stability is determined by an adhesion strength test using norm DIN EN ISO 2409:2013-06.

2. The soft magnetic laminated core according to claim 1, wherein the first soft magnetic alloy of the first laminations comprises a FeSi-based alloy and the second soft magnetic alloy of the second laminations comprises a CoFe-based alloy.

3. The soft magnetic laminated core according to claim 1, wherein the first soft magnetic alloy of the first laminations comprises a Fe—Si-based alloy comprising 2 weight % to 4.5 weight % of at least one of the group consisting of Si and Al, with remainder comprising Fe and unavoidable impurities.

4. The soft magnetic laminated core according to claim 1, wherein the second soft magnetic alloy of the second laminations comprises a CoFe-based alloy comprising 35 to 55 wt % Co, up to 2.5 wt % V, with the remainder comprising Fe and unavoidable impurities.

5. The soft magnetic laminated core according to claim 4, wherein the CoFe-based alloy comprises 45 wt %≤Co≤52 wt %, 45 wt %≤Fe≤52 wt %, 0.5 wt %≤V≤2.5 wt %, remainder Fe and unavoidable impurities.

6. The soft magnetic laminated core according to claim 4, wherein the CoFe-based alloy comprises 35 wt %≤Co≤55 wt %, 0 wt %≤Ni≤0.5 wt %, 0.5 wt %≤V≤2.5 wt %, remainder Fe and unavoidable impurities.

7. The soft magnetic laminated core according to claim 4, wherein the CoFe-based alloy comprises 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, remainder Fe and unavoidable impurities.

8. The soft magnetic laminated core according to claim 1, wherein the first laminations include a first insulating coating and the second laminations include a second insulating coating and the first insulating coating and the second insulating coating are one of the same composition or of different compositions.

9. The soft magnetic laminated core according to claim 1, wherein the insulating coating of the first laminations and/or of the second laminations comprises an inorganic material.

10. The soft magnetic laminated core according to claim 9, wherein the first soft magnetic alloy of the first laminations comprises a FeSi-based alloy and the insulating coating comprising the inorganic material is disposed on the first soft magnetic alloy.

11. The soft magnetic laminated core according to claim 1, wherein the insulating coating of the first laminations and/or of the second laminations comprises a dielectric material, the dielectric material comprising Magnesium oxide or Zirconium oxide.

12. The soft magnetic laminated core according to claim 11, wherein the second soft magnetic alloy of the second laminations comprises a CoFe-based alloy and the dielectric material comprises Magnesium oxide.

* * * * *